United States Patent
Neher et al.

(10) Patent No.: US 9,127,895 B2
(45) Date of Patent: Sep. 8, 2015

(54) HEAT EXCHANGER

(75) Inventors: Stefan Neher, Salach (DE); Johannes Pfeffer, Tübingen (DE); Alexander Steck, Kusterdingen-Wankheim (DE); Helmut Weiser, Holzgerlingen (DE)

(73) Assignee: MAHLE BEHR GMBH & CO. KG, Stuttgart (DE)

( * ) Notice: Subject to any disclaimer, the term of this patent is extended or adjusted under 35 U.S.C. 154(b) by 1196 days.

(21) Appl. No.: 12/178,293

(22) Filed: Jul. 23, 2008

(65) Prior Publication Data

US 2009/0020275 A1  Jan. 22, 2009

Related U.S. Application Data

(63) Continuation-in-part of application No. 12/161,748, filed as application No. PCT/EP2007/000536 on Jan. 23, 2007.

(30) Foreign Application Priority Data

Jan. 23, 2006  (DE) .......................... 10 2006 003 303

(51) Int. Cl.
  *F28F 7/00* (2006.01)
  *F28F 9/02* (2006.01)
  (Continued)

(52) U.S. Cl.
  CPC .......... *F28F 9/0241* (2013.01); *F02M 25/0737* (2013.01); *F28D 7/1684* (2013.01); *F28D 9/0043* (2013.01); *F28F 9/0219* (2013.01); *F28F 9/0236* (2013.01); *F28F 9/18* (2013.01); *F28F 13/12* (2013.01); *F28F 9/0131* (2013.01);
  (Continued)

(58) Field of Classification Search
  CPC ..... F28F 9/0219; F28F 9/0236; F28F 9/0241; F28F 13/12; F28F 2230/00; F28F 2213/005; F28F 2240/00; F28F 2255/02; F28F 2265/26; F28F 1/02; F28F 1/04; F28F 1/045; F02M 25/0737; F28D 7/1684; F28D 7/1692; F28D 9/0043
  USPC ........................................ 165/81, 82, 83, 158
  See application file for complete search history.

(56) References Cited

U.S. PATENT DOCUMENTS 2,152,266 A * 3/1939 McNeal .......................... 165/83
2,468,903 A   5/1949 Villiger
(Continued)

FOREIGN PATENT DOCUMENTS

DE          8 109        11/1879
DE       20 36 398 C3     2/1971
(Continued)

OTHER PUBLICATIONS

Non-Final Office Action mailed May 2, 2012 in copending U.S. Appl. No. 12/161,748 (19 pgs.).

(Continued)

*Primary Examiner* — Frantz Jules
*Assistant Examiner* — Keith Raymond
(74) *Attorney, Agent, or Firm* — Foley & Lardner LLP

(57) ABSTRACT

The invention relates to a heat exchanger, especially for cooling exhaust gases. Said heat exchanger comprises at least one first flow channel for a first medium, at least one second flow channel for a second medium, at least one bottom that can be connected to the housing, said bottom having at least one expansion element.

26 Claims, 6 Drawing Sheets

Figure 1:
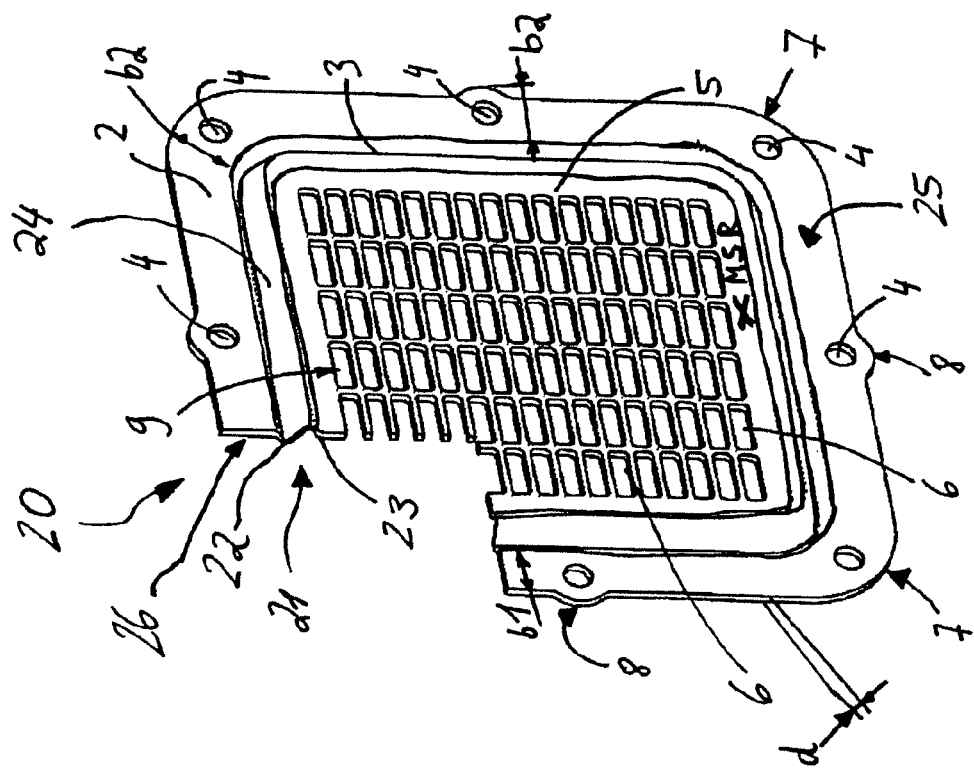

(51) Int. Cl.
  *F28F 9/18* (2006.01)
  *F02M 25/07* (2006.01)
  *F28D 7/16* (2006.01)
  *F28D 9/00* (2006.01)
  *F28F 13/12* (2006.01)
  *F28F 9/013* (2006.01)

(52) U.S. Cl.
  CPC ......... *F28F 2230/00* (2013.01); *F28F 2265/26* (2013.01); *Y02T 10/121* (2013.01); *Y10T 29/4935* (2013.01)

(56) References Cited

U.S. PATENT DOCUMENTS

| | | | |
|---|---|---|---|
| 2,530,798 A | | 11/1950 | Arvins et al. |
| 2,933,291 A | * | 4/1960 | Huggins .................. 165/83 |
| 3,121,559 A | | 2/1964 | Tippmann |
| 3,311,163 A | | 3/1967 | Owen |
| 3,973,621 A | * | 8/1976 | Bow et al. ................ 165/83 |
| 3,976,312 A | | 8/1976 | Murphree |
| 4,635,712 A | * | 1/1987 | Baker et al. .............. 165/82 |
| 4,921,680 A | * | 5/1990 | Bonk et al. .............. 422/625 |
| 5,044,431 A | * | 9/1991 | Cameron ................ 165/158 |
| 5,904,042 A | * | 5/1999 | Rohrbaugh .............. 60/298 |
| 6,289,982 B1 | * | 9/2001 | Naji ....................... 165/177 |
| 6,474,408 B1 | * | 11/2002 | Yeh et al. ............... 165/82 |
| 7,044,116 B2 | | 5/2006 | Juschka et al. |
| 7,048,042 B2 | | 5/2006 | Juschka |
| 7,174,948 B2 | * | 2/2007 | Schindler et al. ........ 165/81 |
| 2002/0195239 A1 | * | 12/2002 | Duerr et al. ............. 165/171 |
| 2005/0034843 A1 | * | 2/2005 | Schindler et al. ........ 165/83 |
| 2006/0048759 A1 | | 3/2006 | Hendrix et al. |
| 2006/0201653 A1 | | 9/2006 | Birkert et al. |
| 2007/0199680 A1 | * | 8/2007 | Helms et al. ............ 165/81 |
| 2009/0020275 A1 | * | 1/2009 | Neher et al. ............ 165/170 |

FOREIGN PATENT DOCUMENTS

| | | |
|---|---|---|
| DE | 21 35 030 A | 2/1973 |
| DE | 31 26 422 C2 | 1/1983 |
| DE | 229 281 A3 | 10/1985 |
| DE | 37 34 523 A1 | 4/1989 |
| DE | 201 00 968 U1 | 6/2001 |
| DE | 102 04 107 A1 | 9/2003 |
| DE | 102 18 521 A1 | 11/2003 |
| DE | 102 24 263 A1 | 12/2003 |
| DE | 10 2004 001 787 A1 | 12/2005 |
| FR | 1 001 826 A | 2/1952 |
| GB | 1 309 659 | 3/1973 |
| JP | 56033468 U | 4/1981 |
| JP | 56033494 U | 4/1981 |
| JP | 63109888 U | 7/1988 |
| JP | 2002054511 A | 2/2002 |
| JP | 2004177058 A | 6/2004 |
| JP | 2006220289 A | 8/2006 |
| RU | 5241 U1 | 10/1997 |
| RU | 7188 U1 | 7/1998 |
| RU | 2206851 C1 | 6/2003 |
| RU | 2211423 C2 | 8/2003 |
| SU | 1132137 A1 | 8/2003 |
| WO | WO 92/09859 A1 | 6/1992 |
| WO | WO 94/02180 A1 | 2/1994 |
| WO | WO 02/18758 A2 | 3/2002 |
| WO | WO 03/036214 A1 | 5/2003 |

OTHER PUBLICATIONS

Final Office Action mailed Nov. 28, 2012 in co-pending U.S. Appl. No. 12/161,748 (17 pgs.).
Final office action mailed Nov. 12, 2013 in co-pending U.S. Appl. No. 12/161,748 (19 pgs.).
Office Action mailed Apr. 19, 2013 in co-pending U.S. Appl. No. 12/161,748 (17 pages).
Office Action mailed Jun. 28, 2011 in related Japanese Application No. 2008-550699 (3 pages.).
Final Office Action mailed Sep. 24, 2014 in co-pending U.S. Appl. No. 12/161,748 (22 pgs.).
Office Action mailed Apr. 3, 2012 in related Japanese application 2008-550699 (3 pgs.).
Office Action mailed Jul. 23, 2010 in related Russian Application No. 2008134494 (9 pgs.).

* cited by examiner

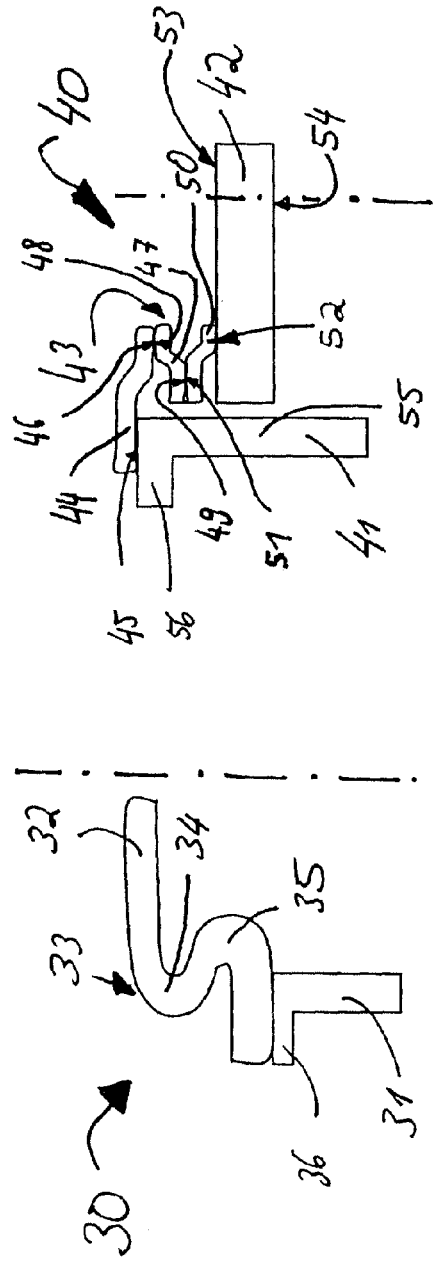
FIGURE 4
FIGURE 3
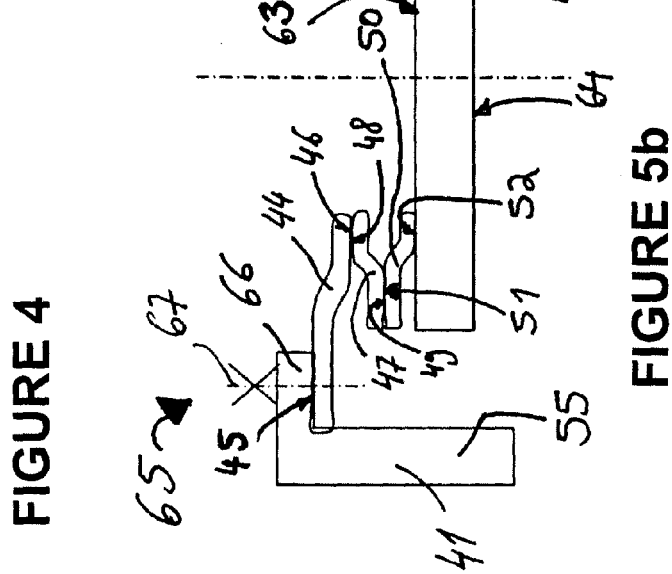
FIGURE 5a
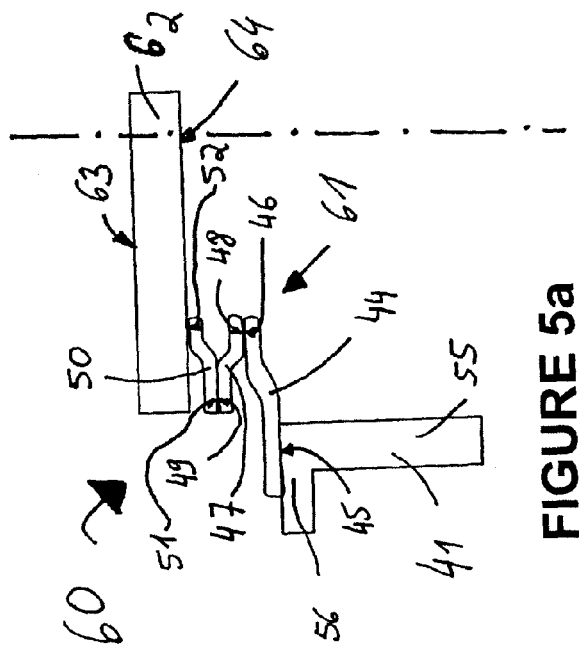
FIGURE 5b

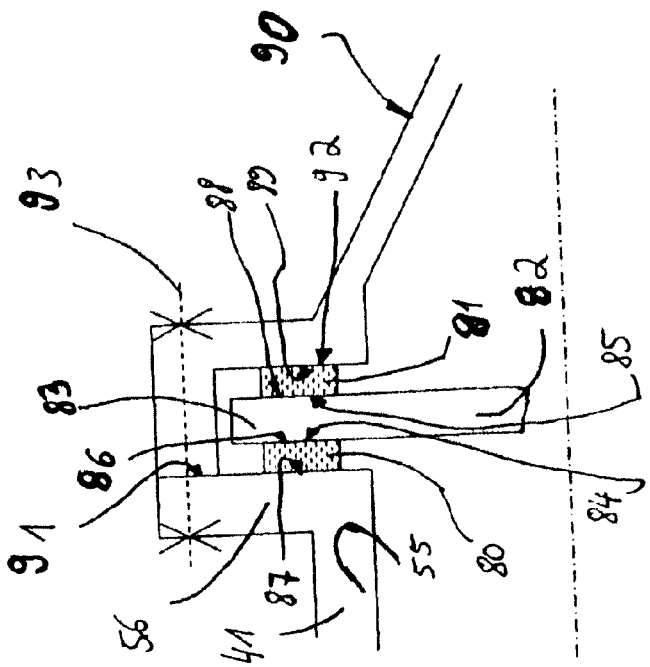
FIGURE 7
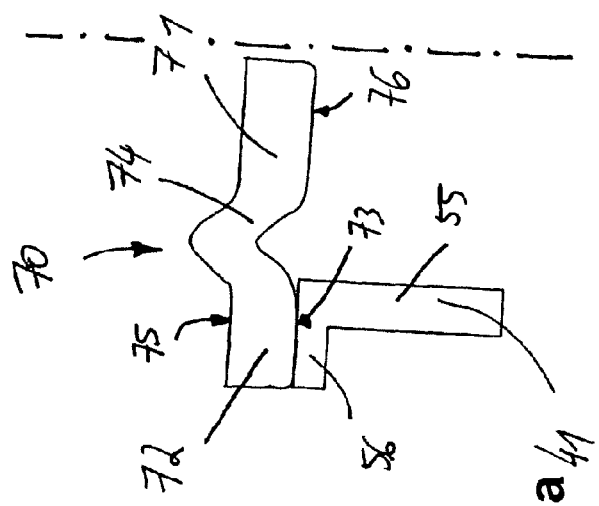
FIGURE 6a
FIGURE 6b

HEAT EXCHANGER

CROSS-REFERENCE TO RELATED PATENT APPLICATIONS

This application is a Continuation-In-Part of U.S. application Ser. No. 12/161,748, filed Jul. 22, 2008, which is the National Stage of International Application No. PCT/EP2007/000536, filed Jan. 23, 2007, which is based upon and claims the benefit of priority from prior German Patent Application No. 10 2006 003 303.5, filed Jan. 23, 2006, the entire contents of all of which are incorporated herein by reference.

The present invention relates to a heat exchanger, in particular for exhaust gas cooling, according to the preamble of patent claim 1.

During the combustion of fuel in internal combustion engines, exhaust gas arises. Part of the exhaust gas is cooled in heat exchangers, in particular in exhaust gas heat exchangers, and is subsequently admixed with the charge air of the internal combustion engine and supplied to the internal combustion engine.

Various designs of welded or soldered heat exchangers, in particular exhaust gas heat exchangers, as tube-bundle or stacked disk systems are known. Known heat exchangers have, in particular, thin-walled housings. These require additional holding elements for fastening to the engine or to the vehicle. This entails not only additional costs, but also an increased space requirement. When flowing through the heat exchangers, in particular the exhaust gas heat exchangers, the tubes of the heat exchanger experience thermal longitudinal extension and thermal transverse extension. For this reason, the housing has a mostly flexible configuration. Due to this flexibility of the housing, coolant connection pieces, which ensure the inflow and outflow of a cooling medium, are connected in a flexible manner to the engine block of an internal combustion engine or to the engine-side water supply.

DE 102 18 521 A1 discloses an exhaust gas heat exchanger, in particular for motor vehicles with exhaust gas recirculation (AGR), which consists of a housing casing for a coolant and of a tube bundle, through which exhaust gas flows and around which the coolant flows and which is received in the housing via tube bottoms, the tube bundle, tube bottoms and housing forming a force flux closed on itself, a push fit being arranged in the force flux. The ends of the tubes are fastened in a tube bottom which is itself welded to the housing casing. The housing casing has a push fit. An outer ring overlaps an inner ring and with the latter forms a slide fit. The slide fit is sealed off outwardly, that is to say with respect to the atmosphere, by means of two O-rings, so that no coolant can escape outward.

DE 102 04 107 A1 discloses a heat exchanger, in particular exhaust gas heat exchanger for motor vehicles, with a tube bundle, through which a gaseous medium flows and around which a liquid coolant flows and the tubes of which are received with their tube ends in tube bottoms and are connected to these in a materially integral manner, and with a housing casing which surrounds the tube bundle and is connected on the end face to the tube bottoms in a materially integral manner and through which the coolant flows, the tube bottoms and housing casing being produced from a heat-resistant and corrosion-resistant metallic alloy, the housing casing having at least one peripheral expansion bead. This bead gives the housing casing sufficient elasticity in the longitudinal direction of the tubes, so that the housing casing, by elastic extension, can follow the greater extension of the exhaust gas tubes, without an inadmissible deformation or an impairment of the weld seam connection between tubes and bottom and bottom and housing occurring in this case.

Furthermore, DE 102 24 263 A1 discloses an exhaust gas heat exchanger, in particular for motor vehicles with exhaust gas recirculation, consisting of a housing with a housing casing for a coolant and of a tube bundle, through which exhaust gas flows and around which the coolant flows and which is received in the housing via a first and a second tube bottom, the first tube bottom being connected firmly to the housing and therefore forming a fixed bearing for the tube bundle, and the second tube bottom being designed as an elastic plastic bottom. The plastic bottom, on account of its modulus of elasticity, is capable, by elastic deformation, of following certain extensions, such as occur in the tube bundle when the exhaust gas heat exchanger is in operation. This leads to an elastic bulging or deformation of the plastic bottom, with the result that inadmissible stresses in the components are avoided.

The object of the present invention is to improve a heat exchanger of the type initially mentioned.

The object is achieved by means of the features of claim 1.

A heat exchanger for exhaust gas cooling is proposed, with at least one housing, with a first flow duct for a first medium, with at least one second flow duct for a second medium, and with at least one bottom which is connectable to the housing, the bottom having at least one expansion element for the absorption of longitudinal extensions. The first flow duct, in particular the first flow ducts, may be formed by at least one tube, in particular by a number of tubes.

The first medium may be, in particular, a gaseous medium, such as, for example, exhaust gas from an internal combustion engine. The second flow duct may be formed, in particular, between the housing and tube walls of tubes.

The second medium may be, in particular, a fluid, such as, for example, an aqueous liquid or a gaseous fluid, such as, for example, air.

The heat exchanger has, in particular, a bottom which is connectable to the housing. The bottom may, in particular, be connected to the housing in a materially integral manner and/or with a form fit.

According to the invention, the bottom may be produced from a metal, in particular from high-grade steel or aluminum.

The bottom is designed, in particular, in such a way that it has an expansion element. In particular, the expansion element can ensure an axial and/or radial relative movement between the bottom and housing. Furthermore, the expansion element can ensure an axial and/or radial relative movement between at least one first bottom portion and at least one second bottom portion. The expansion element can, in particular, ensure a thermal expansion of the first flow duct, in particular of at least one tube or of at least one disk. According to the invention, the expansion element may be produced from a metal, in particular from high-grade steel, aluminum, etc. The metal may preferably be an elastic metal.

In an advantageous refinement, the expansion element is produced from metal. Particularly advantageously, the expansion element may be connectable to the bottom in a materially integral manner by soldering, welding, etc.

In another version, the expansion element may thereby be produced in one piece with the bottom in a particularly simple way.

In an advantageous development, the expansion element is at least one embossing which, in particular, can be introduced peripherally into the bottom. Thus, at least one first portion of the bottom may be relatively movable, in particular expandable, with respect to at least one second bottom portion.

In an advantageous design, the expansion element is expandable axially in a heat exchanger longitudinal direction.

The expansion element is particularly advantageously expandable into the heat exchanger longitudinal direction.

The heat exchanger longitudinal direction is, in particular, the direction in which the at least one flow duct, in particular the at least one tube, runs. The heat exchanger longitudinal direction may in this case be, in particular, the direction in which the at least one first flow duct, in particular the at least one tube, experiences thermal longitudinal expansion.

In an advantageous version, the expansion element is expandable radially to a heat exchanger longitudinal direction. Particularly advantageously, the expansion element is expandable in the direction of a thermal transverse extension of at least one flow duct, in particular of a first flow duct, such as, for example, of at least one tube.

In a development, the expansion element is at least one ridge. Particularly advantageously, a ridge can be produced by means of a forming manufacturing method, such as, for example, stamping, embossing, rolling, crimping, etc.

In an advantageous development, the expansion element has at least one frame element. Particularly advantageously, the frame element is a frame which, in particular, has an orifice and, in particular, is peripheral.

In a further refinement, at least two frame elements can be arranged essentially parallel and, in particular, concentrically to one another. The two, in particular several, frame elements are arranged, particularly advantageously, in such a way that they run parallel to one another. In particular, the frames are particularly advantageously arranged concentrically to one another. The orifice of the frame may in this case be designed to be circular, oval, rectangular or with rounded corners. Particularly advantageously, the orifices of the frames arranged essentially parallel to one another may be designed in such a way that they can form a cylinder or a parallelepiped.

In an advantageous development, the frame elements are at least in portions connectable in a materially integral manner, in particular by welding, soldering, adhesive bonding, etc. Particularly advantageously, surfaces of the frame elements which, in particular, are adjacent to one another are connected to one another in a materially integral manner, in particular by welding, soldering, adhesive bonding, etc.

In a refinement, the frame elements are at least in portions connectable with a form fit, in particular by screwing, flanging, folding, crimping, etc. The frame elements are in this case particularly advantageously arranged essentially parallel to one another.

In an advantageous development, the expansion element is of meander-shaped design. Particularly advantageously, the portions which are of meander-shaped design can expand or stretch in such a way that they assume essentially a rectilinear shape under load.

In a development, the expansion element is a concertina. A concertina can particularly advantageously be deformed in the longitudinal and/or transverse direction under load.

An advantageous refinement is characterized in that an expansion element is connectable to at least one diffuser. Particularly advantageously, the expansion element may be connected to at least one diffuser.

In an advantageous development, the housing is a cast housing. A cast housing can particularly advantageously be produced by means of a forming manufacturing method, such as, for example, casting, in particular diecasting or chill casting or expendable mold casting.

In a particularly advantageous refinement, at least one connection piece and/or at least one fastening element are/is produced in one piece with the housing. The at least one connection piece and/or the at least one fastening element, in particular for fastening the heat exchanger, for example, to an internal combustion engine, may particularly advantageously be produced together with the housing by means of a forming manufacturing method, such as, for example, casting, in particular expendable mold casting or diecasting.

In a development, the bottom is connectable to the housing in a materially integral manner, in particular by welding, adhesive bonding, etc., and/or with a form fit, in particular by screwing, flanging, folding, crimping, etc.

In an advantageous development, the housing has at least two housing elements which are connectable to one another in a materially integral manner, in particular by welding, soldering, adhesive bonding, etc., and/or with a form fit, in particular by screwing, flanging, folding, crimping, etc. Particularly advantageously, the housing may be formed, for example, from two or a number of housing elements which consist of sheet metal and which, in particular, may be connected to one another in a materially integral manner and/or with a form fit.

In a refinement, the heat exchanger can have an I-flow throughflow. Particularly advantageously, in particular, a first medium enters the heat exchanger through a first orifice, flows through the heat exchanger and emerges from the heat exchanger through another orifice.

In a development, the heat exchanger can have a U-flow throughflow. In particular, a first medium enters the heat exchanger through one orifice, flows through the heat exchanger, experiences, in particular, a reversal of direction and leaves the heat exchanger, in particular through a further orifice, on an inlet side of the first medium into the heat exchanger. In a particularly advantageous way, the heat exchanger has, in particular, only one bottom.

In a development, the heat exchanger can have a single-flood or multi-flood throughflow.

According to the invention, furthermore, a heat exchanger for exhaust gas cooling is proposed, with at least one housing, with at least one first flow duct for a first medium, with at least one second flow duct for a second medium, with at least one bottom, with at least one diffuser, and with at least one expansion element, the at least one expansion element being arrangeable, spaced apart, spaced apart at least in portions, between the bottom and the housing, and spaced apart, spaced apart at least in portions, between the bottom and the diffuser. In particular, the first flow duct for a first medium, such as, for example, exhaust gas, may be designed as a tube or as a number of tubes. In particular, a second medium, such as, for example, a cooling medium, in particular an aqueous cooling liquid or air, may flow through the second flow duct. The second flow duct may be formed, in particular, between the housing and tube walls of at least one tube or at least one disk. The at least one expansion element is arranged, in particular, between the bottom and the housing and may at least in portions touch the bottom and the housing. Furthermore, the at least one expansion element or, in particular, another expansion element is arranged between the bottom and the diffuser. The expansion element may at least in portions touch the bottom and the diffuser.

In a further advantageous refinement, a first expansion element is arrangeable, spaced apart, spaced apart at least in portions, between the bottom and the housing, and a second expansion element is arrangeable, spaced apart, spaced apart at least in portions, between the bottom and the diffuser. Particularly advantageously, the first expansion element may at least in portions touch the bottom and the housing. Particularly advantageously, the second expansion element may at least in portions touch the bottom and the diffuser.

In an advantageous development, the at least one expansion element is a sealing element. Thus, particularly advantageously, the emergence of at least one medium from inside the housing of the heat exchanger outward can be prevented.

In an advantageous design, the first medium is exhaust gas and/or the second medium is a cooling medium, in particular an aqueous cooling fluid or air.

In a further advantageous version, the first flow duct, in particular the first flow ducts, are tubes, in particular flat tubes, and the second flow duct is formed between the tubes and the housing. Flat tubes may be, in particular, tubes which have essentially a cross section in the form of a long hole or a rectangular cross section, two sides of the rectangle surface or of the long-hole surface being designed to be substantially longer than the other two rectangle surfaces or the other two long-hole surfaces.

In an advantageous development, the second flow duct, in particular the second flow ducts, are tubes, in particular flat tubes, and the first flow duct is formed between the tubes and the housing. Particularly advantageously, the first flow duct may be formed between outer surfaces of the tubes and the housing inner wall.

In an advantageous development, the tubes have turbulence-generating elements. Particularly advantageously, the turbulence-generating elements may be embossings, such as winglets or bosses. In another advantageous refinement, the turbulence-generating elements may be, for example, punched-out and/or formed metal sheets which, in particular, can be inserted into the tubes.

In an advantageous design, the turbulence-generating elements are embossings which can be introduced into the tube. Particularly advantageously, the embossings may be introduced into the tube by means of a forming manufacturing method.

In an advantageous refinement, the tubes touch the housing at least in portions. The tubes may particularly advantageously be supported on the housing.

In an advantageous development, the embossings touch the housing at least in portions. In particular, the embossings may particularly advantageously be supported on the housing.

In a further refinement, the embossings of at least one tube touch at least in portions at least one tube adjacent to the tube. Particularly advantageously, the tubes touch one another by means of the embossings and are supported with respect to one another.

In a development, at least one first disk has a first disk topside and a first disk underside. Particularly advantageously, the first disk topside may be a surface on the disk and the first disk underside may be a further surface on the disk. Particularly advantageously, the first disk topside and the first disk underside may be located on sides of the disk which lie opposite one another.

In an advantageous refinement, at least one second disk has a second disk topside and a second disk underside. Particularly advantageously, the second disk topside may be a surface on the topside of the disk and the second disk underside may be a surface on the underside of the disk. The second disk topside and the second disk underside may particularly advantageously be arranged on sides of the second disk which lie opposite one another.

In a further refinement, in each case a first disk is arranged adjacently in each case to a second disk, the first and the second disks forming a disk stack.

In a development, the first flow duct is formed between at least one first disk topside and at least one second disk underside and/or the second flow duct is formed between at least one first disk underside and at least one second disk topside.

In an advantageous development, the second flow duct is formed between at least one first disk topside and at least one second disk underside and/or the first flow duct is formed between at least one first disk underside and at least one second disk topside.

In an advantageous refinement, the first flow duct is formed between at least one disk and the housing. Particularly advantageously, the first flow duct may be formed between a plurality of disks and the inner wall of the housing.

In a further design, the second flow duct is formed between at least one disk and the housing. Particularly advantageously, the second flow duct may be formed between a number of disks and an inner wall of the housing.

According to the invention, furthermore, a method for producing a heat exchanger is proposed, the housing being produced by means of a forming manufacturing method. Particularly advantageously, the forming manufacturing method may be casting, such as, for example, expendable mold casting or diecasting.

In an advantageous development, the method for producing a heat exchanger is characterized in that the housing is produced by casting, in particular expendable mold casting, such as, for example, sand casting.

Further advantageous refinements of the invention may be gathered from the subclaims and from the drawing.

Figure 2:
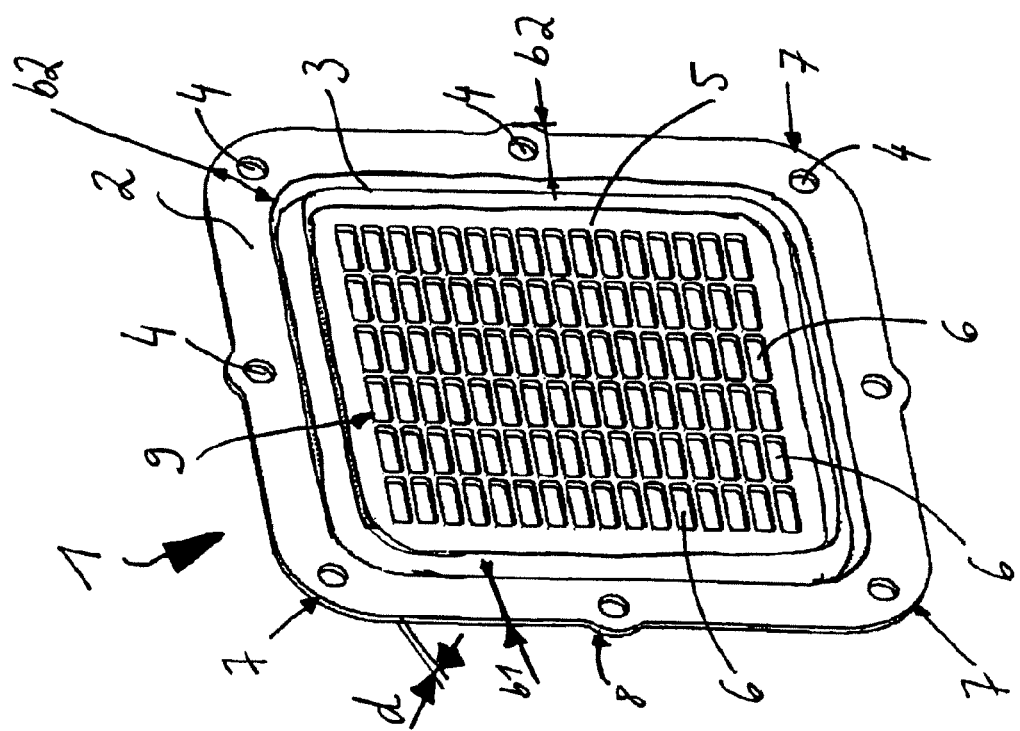
Figures 8, 9:
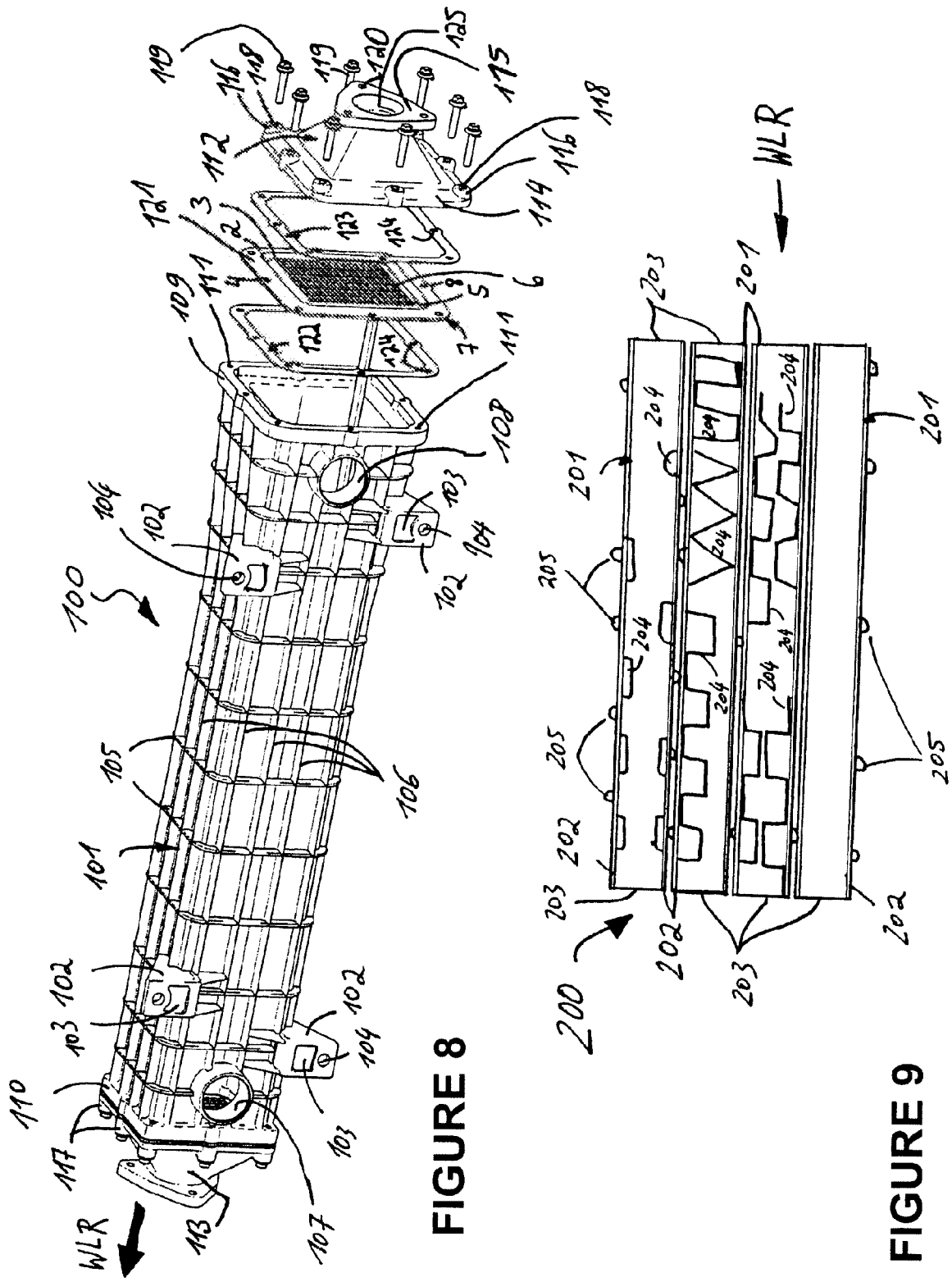
Figure 10:
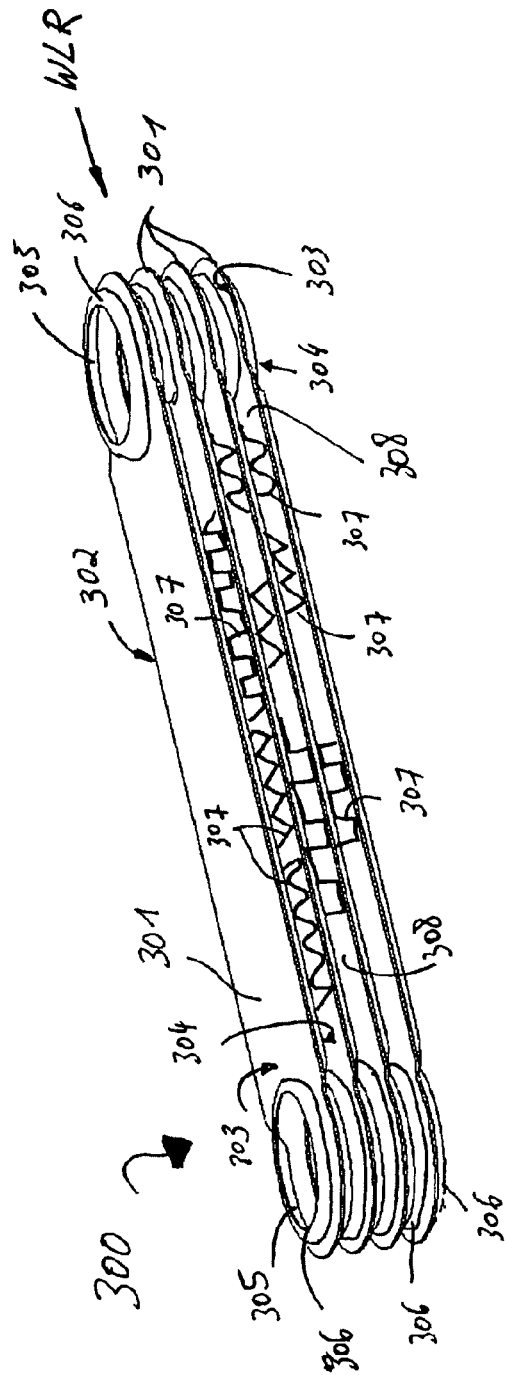
Figure 11:
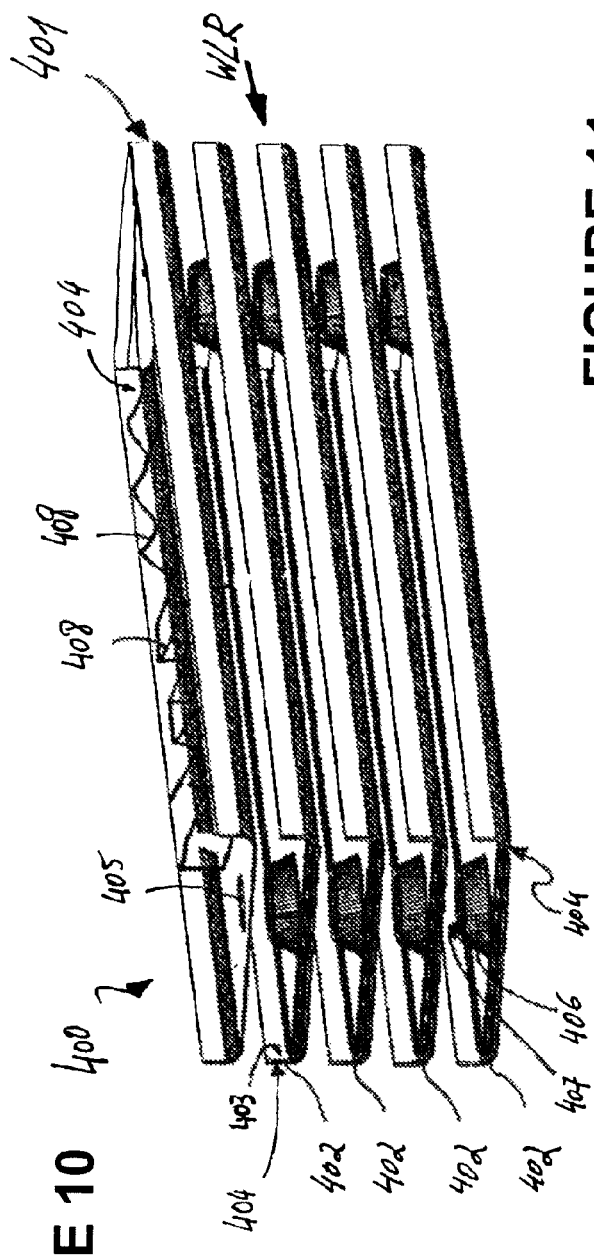
Figure 12:
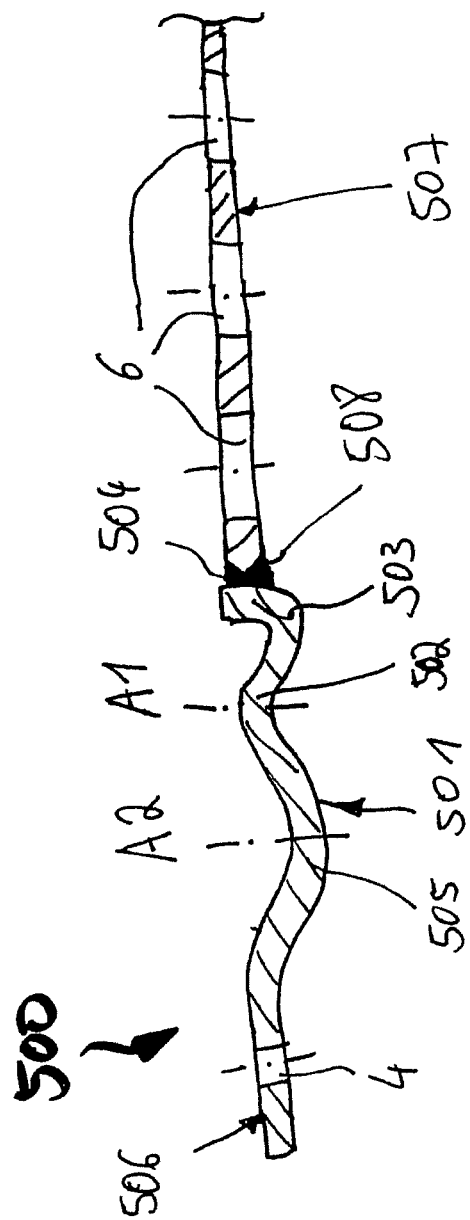

Exemplary embodiments of the invention are illustrated in the drawing and are explained in more detail below. In the drawing:

FIG. 1 shows a bottom with an expansion element in the form of an S-shaped double bead, FIG. 2 shows a sectional illustration of a bottom with an expansion element in the form of an S-shaped double bead, FIG. 3 shows a sectional illustration of an expansion element in the form of an S-shaped double bead in conjunction with a housing wall portion, FIG. 4 shows a sectional illustration of a further embodiment of an expansion element in the form of a concertina which is connected to the bottom outside, FIG. 5a shows a sectional illustration of a further version of an expansion element in the form of a concertina which is connected to the bottom inside, FIG. 5b shows a sectional illustration of a further version of an expansion element in the form of a concertina with a housing flange pointing inward, FIG. 6a shows a sectional illustration of a further version of an expansion element in the form of a ridge introduced into the bottom, FIG. 6b shows a sectional illustration of a further version of an expansion element in the form of a ridge introduced into the bottom, the housing flange pointing inward, FIG. 7 shows a sectional illustration of a housing portion in conjunction with a diffuser portion, with a first expansion element which is arranged between the housing portion and a bottom portion, and with a second expansion element which is arranged between a diffuser portion and a bottom portion, FIG. 8 shows an exploded illustration of a heat exchanger in each case with a bottom, in each case with an expansion element and in each case with a diffuser, FIG. 9 shows a sectional illustration of a flat tube bundle with turbulence-generating elements, FIG. 10 shows a disk stack with turbulence-generating elements between the disks, FIG. 11 shows a further version of a disk stack with turbulence-generating elements between the disks, FIG. 12 shows a further version as an enlarged illustration of a detail of a bottom with an expansion element.

FIG. 1 shows a bottom with an expansion element in the form of an S-shaped double bead.

The bottom 1 has a bottom frame 2 and a bottom surface 5. Furthermore, the bottom has a bottom thickness d. The bottom 1 is produced essentially from a material which has a low density. In particular, the bottom 1 is produced from a metal, such as, for example, from high-grade steel. In another version, the bottom may be produced from plastic or from aluminum.

The bottom thickness d assumes essentially values of 0.5 mm<d<7.0 mm, in particular values of between 0.5 mm<d<4 mm, in particular values of between 0.5 mm and 3.0 mm, in particular values of between 0.5 mm<d<2.5 mm, in particular values of between 1 mm<d<2.5 mm, in particular values of between 1.5 mm<d<2.0 mm, in particular values of between 1.6 mm<d<1.9 mm, in particular values of between 1.65 mm<d<1.85 mm.

The bottom frame 2 has at least one bottom fastening orifice 4. In the exemplary embodiment illustrated, the bottom frame 2 has eight fastening orifices 4. In another exemplary embodiment, not illustrated, the bottom frame 2 has more than eight bottom fastening orifices or between one and eight bottom fastening orifices.

The frame 2 is of essentially rectangular, in particular square design. In the exemplary embodiment illustrated, the frame 2 has four frame corners 7. In another exemplary embodiment, not illustrated, the frame has more than four frame corners 7 or between one and four frame corners 7.

In the exemplary embodiment illustrated, the frame corners 7 are rounded and have a frame corner radius, not designated in any more detail. In another exemplary embodiment, the frame corners may be of heptagonal design.

The bottom fastening orifices 4 are arranged essentially in that portion of the frame 2 in which the frame corners 7 are arranged. Furthermore, at least one further bottom fastening orifice 4 is arranged in the frame 2 essentially between the bottom fastening orifices 4 which are arranged in the portion of the frame corners 7. In this portion, the frame 2 has a circular portion 8.

The circular portion serves essentially for enlarging a contact surface, not designated, of the bottom frame 2 with a fastening element, not illustrated, in particular a screw or a nut.

The frame has a second frame width b2 in the portion in which the fastening orifices 4 are arranged. In the other portions, the bottom frame 2 has a first frame width b1. The first frame width b1 is substantially smaller than the second frame width b2. Thus, particularly advantageously, material can be saved.

In the exemplary embodiment illustrated, the bottom frame 2 is produced in one piece with the bottom plate 5. The bottom plate has essentially the bottom thickness d. In another exemplary embodiment, not illustrated, the bottom frame 2 is not produced in one piece with the bottom plate 5. The bottom frame 2 is then connected at least in portions to the bottom plate 5.

The bottom frame 2 may be connected to the bottom plate 5, for example, in a materially integral manner, in particular by welding, soldering, adhesive bonding, etc., and/or with a form fit, in particular by folding, flanging, crimping, etc.

The bottom plate 5 has a number of bottom surface orifices 6. The bottom surface orifices 6 are designed essentially as a long hole.

The bottom surface orifices 6 are arranged essentially parallel to one another. In the exemplary embodiment illustrated, the bottom surface orifices are arranged in six rows. The six rows in each case have 16 bottom surface orifices 6. The six rows are arranged essentially parallel to one another.

In another exemplary embodiment, not illustrated, the bottom surface orifices 6 may be arranged in one to six rows or in more than six rows.

A row may have between one bottom surface orifice 6 and sixteen bottom surface orifices 6 or more than sixteen bottom surface orifices 6.

The bottom surface orifices 6 are arranged essentially in grid form. The grid, not designated in any more detail, on bottom surface orifices 6 is arranged essentially concentrically to the bottom 1 or to the bottom plate 5.

The bottom plate 5 has at least one double bead 3. The double bead 3 is arranged essentially between the bottom frame 2 and a lattice, not designated in any more detail, which is formed, in particular, by the grid of bottom surface orifices 6. The double bead 3 consists of a first single bead and of a second single bead.

The first single bead, not designated in any more detail, is an essentially valley-shaped embossing into the bottom plate 5.

The second single bead, not designated in any more detail, is an essentially ridge-shaped embossing into the bottom plate 5. The first single bead, not designated in any more detail, is formed essentially concentrically to the frame 2. The first single bead is arranged essentially peripherally around the bottom surface orifice lattice 9.

The second single bead, are not designated in any more detail, is arranged essentially concentrically to the bottom frame 2. The second single bead is arranged essentially concentrically to the first single bead. The second single bead is arranged essentially between the first single bead and the bottom surface orifice lattice 9. The second single bead is arranged essentially peripherally around the bottom surface orifice lattice 9.

In another exemplary embodiment, not illustrated, the first single bead is designed as a ridge and the second single bead is designed as an essentially peripheral valley.

In another exemplary embodiment, not illustrated, the first single bead and the second single bead are designed as a valley or as a ridge.

In another exemplary embodiment, not illustrated, more than two single beads are arranged essentially peripherally around the bottom surface orifice lattice 9. In particular, 3, 4, 5, 6, 7, etc. single beads are arranged essentially peripherally around the bottom surface orifice lattice 9. The single beads are, in particular, embossed into the bottom plate 5, for example by stamping, forming, pressing, rolling, etc.

The bottom 1 is produced essentially by means of a forming manufacturing method, such as, for example, stamping, embossing, etc.

In another exemplary embodiment, the bottom 1 is produced by means of a forming manufacturing method, such as, for example, casting, in particular diecasting.

In another exemplary embodiment, the bottom 1 is formed at least in portions from a composite fiber material.

In the exemplary embodiment illustrated, the bottom 1 is designed to be essentially rectangular, in particular square, and, in particular, with rounded corners.

In another exemplary embodiment, the bottom 1 may be designed to be circular and/or elliptic and/or star-shaped and/or angular or as a combination of the abovementioned forms.

FIG. 2 shows a sectional illustration of a bottom with an expansion element in the form of an S-shaped double bead. Identical features are given the same reference symbols as in FIG. 1.

The bottom 20 has an expansion element 24. The expansion element 24 is designed essentially as a double bead 21. The double bead 21 has essentially an S-shaped cross section. The double bead 21 comprises essentially a first single bead 22 and a second single bead 23.

The bottom 20 has a bottom outside 25 and a bottom inside 26. The bottom outside 25 is arranged essentially opposite the bottom inside 26.

A media flow direction MSR runs essentially perpendicularly with respect to the bottom 20. The media flow direction MSR runs essentially from the bottom outside 25 in the direction of the bottom inside 26.

In particular, a first flow medium, such as, for example, exhaust gas, can enter a heat exchanger, not illustrated, through the bottom surface orifices 16 in the media flow direction MSR and emerge from a heat exchanger, not illustrated, opposite to the media flow direction MSR.

The first single bead is essentially a valley-shaped embossing. The valley-shaped embossing is formed in the media flow direction MSR from the bottom 20 or from the bottom plate 5. The first single bead 22 has a round edge, not designated in any more detail.

In another version, the first single bead 22 may, for example, have a V-shaped cross section.

In the exemplary embodiment illustrated, it has essentially a U-shaped cross section.

In a further exemplary embodiment, not illustrated, the single bead 22 may be designed essentially as an angular U.

The first single bead 22 is arranged essentially peripherally around the bottom surface orifice lattice 9. The single bead 22 is arranged essentially concentrically to the bottom frame 2, in particular between the bottom frame 2 and the bottom surface orifice lattice 9. The first single bead 22 is introduced into the bottom 20, in particular into the bottom plate 5, essentially by means of a forming manufacturing method, such as, for example, embossing, stamping, rolling, etc.

A further second single bead 23 is arranged between the first single bead and the bottom surface orifice lattice 9. The second single bead 23 is formed essentially opposite to the media flow direction MSR from the bottom 20, in particular from the bottom plate 5. The second single bead has essentially a U-shaped cross section. The U-shaped cross section may be designed as a round U or as an angular U. In a further exemplary embodiment, not illustrated, the cross section of the second single bead 23 is of V-shaped design. The second single bead 23 is arranged essentially peripherally around the bottom surface orifice lattice 9. The second single bead 23 is arranged essentially concentrically to the first single bead 22.

In another exemplary embodiment, not illustrated, the first single bead 22 and the second single bead 23 are formed in the media flow direction MSR.

In another embodiment, not illustrated, the first single bead 22 and the second single bead 23 are arranged essentially opposite to the flow direction MSR.

In another exemplary embodiment, the bottom 20 has one or more than two single beads.

FIG. 3 shows a sectional illustration of an expansion element in the form of an S-shaped double bead in conjunction with a housing wall portion.

The housing portion 31 has a flange portion 36. The flange portion 36 of a flange, not illustrated any further, is formed essentially perpendicularly to the housing portion 31.

In another exemplary embodiment, not illustrated, the flange can have an angle of between 30° and 120°, in particular between 40° and 100°, with respect to the housing portion 31.

The bottom portion 32 touches the flange portion 36 at least in portions. Essentially, a bottom margin portion, not designated in any more detail, of the bottom portion 32 is arranged essentially parallel to the flange portion 36. The bottom margin portion is connected at least in portions to the flange portion 36 in a materially integral manner, for example by joining, such as, for example, by welding, soldering, adhesive bonding, etc., and/or with a form fit, in particular such as, for example, by folding, crimping, flanging, etc.

The bottom portion 32 has a double bead 33. The double bead 33 is of essentially S-shaped design. In a way not illustrated, the double bead 33 is arranged essentially peripherally. The double bead 33 has a first single bead 34 and a second single bead 35.

The first single bead 34 is of essentially U-shaped design, in particular as a round U.

In another exemplary embodiment, not illustrated, the first single bead has an angularly U-shaped or V-shaped design.

The second single bead 35 is of essentially U-shaped design, in particular as a round U.

In another exemplary embodiment, the second single bead 35 is designed essentially as an angular U or is of V-shaped design.

The end portion of the bottom portion 32 is formed essentially parallel to the bottom portion 32.

In another exemplary embodiment, not illustrated, the bottom end portion, not designated, has an angle with respect to the bottom portion 32. The angle may assume values of between 0° and 130°.

FIG. 4 shows a sectional illustration of a further embodiment of an expansion element in the form of a concertina which is connected to the bottom outside.

The expansion element 40 is designed as a concertina 43. The expansion element 40 or the concertina 43 has a first frame element 44, a second frame element 47 and a third frame element 50. The first frame element 44, the second frame element 47 and the third frame element 50 are connected at least in portions in a materially integral manner, in particular by soldering, welding, adhesive bonding, etc., and/or with a form fit, in particular by folding, flanging, crimping, screwing, etc.

The first frame element 44 has a first end portion, not designated in any more detail, which has a first contact portion 45 of the first frame element. Furthermore, the first frame element 44 has a second end portion, not designated in any more detail, which has a second contact portion 46 of the first frame element. The first frame element 44 has essentially a kink between the first end portion and the second end portion. The kink is formed essentially peripherally. The first end portion, not designated in any more detail, of the first frame element and the second end portion, not designated in any more detail, of the first frame element are designed essentially parallel to one another.

The second frame element 47 has a frame end portion, not designated in any more detail, which has a first contact portion 48 of the second frame element. Furthermore, the second frame element 47 has a second frame end portion, not designated in any more detail, which has a second contact portion 49 of the second frame element 47. Essentially a kink is formed in the second frame element 47 between the first frame end portion, not designated in any more detail, of the second frame element 47 and the second frame end portion, not designated in any more detail, of the second frame element 47. The kink, not designated in any more detail, is arranged essentially peripherally in the second frame element 47. The first frame end portion, not designated in any more detail, of the second frame element is arranged essentially parallel to the second frame end portion, not designated in any more detail, of the second frame element 47.

A third frame element 50 has a frame end portion, not designated in any more detail, of the third frame element 50, said frame end portion having a first contact portion 51 of the third frame element 50. Furthermore, the third frame element 50 has a second frame end portion, not designated in any more detail, which has a second contact portion 52 of the third frame element 50. A kink is introduced into the third frame element 50 between the first end portion, not designated in any more detail, of the third frame element 50 and the second end portion, not designated in any more detail, of the third frame element 50. The kink is formed essentially peripherally in the third frame element 50. The first end portion, not designated in any more detail, of the third frame element 50 is arranged essentially parallel to the second end portion, not designated in any more detail, of the third frame element 50.

The housing portion 41 has a housing wall portion 55 and a housing flange portion 56. The housing flange portion 56 is the portion of a housing flange, not illustrated any further. The housing flange portion 56 touches the first contact portion 45 of the first frame element at least in portions. In particular, the first contact portion 45 of the first frame element is connected at least in portions to the housing flange portion 56 in a materially integral manner, in particular by welding, soldering, adhesive bonding, etc., and/or with a form fit, in particular by crimping, folding, flanging, screwing, etc. The housing flange portion 56 is formed essentially perpendicularly to the housing wall portion 55.

In another embodiment, not illustrated, the housing flange portion 56 has an angle, not designated in any more detail, with respect to the housing wall portion 55. The angle, not designated in any more detail, assumes essentially values of between 0° and 130°, in particular values of between 45° and 110°. The first contact portion 45 of the first frame element is arranged essentially parallel to the first end portion, not designated in any more detail, of the first frame element. The second end portion, not designated in any more detail, of the first frame element 44 is arranged essentially parallel to the first end portion, not designated in any more detail, of the second frame element 47. The second end portion, not designated in any more detail, of the second frame element 47 is arranged essentially parallel to the first end portion, not designated in any more detail, of the third frame element 50.

The bottom portion 42 has a bottom outside 53 and a bottom inside 54. The bottom outside is arranged essentially parallel to the bottom inside 54.

In another exemplary embodiment, not illustrated, the bottom outside 53 may have an angle with respect to the bottom inside 54. The angle, not designated in any more detail, assumes values of between 0° and 90°, in particular values of between 0° and 40°.

The second contact portion 46 of the first frame element 44 touches the first contact portion 48 of the second frame element 47 at least in portions. In particular, the second contact portion of the first frame element 44 is connected to the first contact portion 48 of the second frame element 47 in a materially integral manner, in particular by welding, soldering, adhesive bonding, etc., and/or with a form fit, in particular by crimping, folding, flanging, screwing, etc.

The second contact portion 49 of the second frame element 47 touches the first contact portion 51 of the third frame element 50 at least in portions. In particular, the second contact portion 49 of the second frame element 47 is connected to the first contact portion 51 of the third frame element 50 in a materially integral manner, in particular by welding, soldering, adhesive bonding, etc., and/or with a form fit, in particular by folding, flanging, crimping, screwing, etc.

The second contact portion 52 of the third frame element 50 touches the bottom outside 53 of the bottom portion 42 at least in portions. The second contact portion 52 of the third frame element 50 is connected to the bottom outside 53 of the bottom portion 42 in a materially integral manner, in particular by welding, soldering, adhesive bonding, etc., and/or with a form fit, in particular by crimping, folding, flanging, screwing, etc.

In another exemplary embodiment, not illustrated, the first frame element 44, the second frame element 47 and the third frame element 50 are produced in one piece.

In another exemplary embodiment, not illustrated, the bottom portion 42, the first frame element 44, the second frame element 47 and the third frame element 50 are produced in one piece.

The concertina 43 or the first frame element 44 and/or the second frame element 47 and/or the third frame element 50 are produced from a material with low density, such as, for example, from a metal, such as, for example, aluminum, high-grade steel, or from a plastic, such as, for example, from an elastomer, such as rubber, or from a polymer, etc.

In particular, the concertina 43 or the first frame element 44 and/or the second frame element 47 and/or the third frame element 50 may be designed at least in portions as a sealing element.

The concertina 43 or the first frame element 44 and/or the second frame element 47 and/or the third frame element 50 may in another exemplary embodiment, not illustrated, be produced from a composite fiber material.

The bottom portion 42 of the bottom, not illustrated, may, in particular, be produced from a metal, for example from a metal with low density, such as, for example, aluminum or high-grade steel, or from a plastic, in particular from an elastomer or from a polymer.

The housing portion 41 of the housing, not illustrated any further, or the housing may be produced from a cast metal, such as, for example, from gray cast iron or from cast aluminum, in particular from diecast aluminum or from expendable mold cast aluminum, such as, for example, from sand casting.

In another exemplary embodiment, not illustrated, the housing, not illustrated, together with the housing portion 41 is produced from a plastic, such as, for example, from a thermosetting plastic or an elastomer. In another exemplary embodiment, not illustrated, the concertina 43 has between one and two or more than three frame elements.

FIG. 5a shows a sectional illustration of a further version of an expansion element in the form of a concertina which is connected to the bottom inside. Identical features are given the same reference symbols as in the preceding figures.

In contrast to FIG. 4, in FIG. 5 the third frame element 50 is connected to the bottom inside 64 of the bottom portion 42. The concertina 61 has a first frame element 44, a second frame element 47 and a third frame element 50.

The bottom portion 62 has a bottom outside 63 and a bottom inside 64. The bottom outside 63 is arranged essentially parallel to the bottom inside 64.

The second contact portion 51 of the third frame element 50 touches the bottom inside 64 at least in portions. The second contact portion 52 of the third frame element 50 is connected at least in portions to the bottom portion 62 in a materially integral manner, in particular by soldering, welding, adhesive bonding, etc., and/or with a form fit, in particular by folding, crimping, flanging, screwing, etc. In the exemplary embodiment illustrated, the concertina has three frame elements.

In another exemplary embodiment, not illustrated, the concertina has one to two or more than three frame elements.

In a further exemplary embodiment, not illustrated, the first frame element 44 and/or the second frame element 47 and/or the third frame element 50 are produced in one piece.

In another exemplary embodiment, not illustrated, the bottom, no longer illustrated, is produced in one piece with the bottom portion 62, the first frame element 44 and/or the second frame element 47 and/or the third frame element 50.

The first frame element 44 and/or the second frame element and/or the third frame element 50 and/or the bottom with the bottom portion 62 are produced, for example, from a metal, in particular with low density, such as, for example, aluminum or high-grade steel, and/or from a plastic, such as, for example, from an elastomer, rubber or from a composite fiber material.

The concertina 61 or the first frame element 44 and/or the second frame element 47 and/or the third frame element 50 are designed at least in portions as a sealing element.

FIG. 5b shows a sectional illustration of a further version of an expansion element 65 in the form of a concertina with a housing flange 66 pointing inward. Identical elements are given the same reference symbols as in the preceding figures.

In contrast to FIG. 5a, the housing portion 41 has a housing flange 66. The housing flange 66 is formed in the direction of the housing interior, not designated in any more detail. Construction space can thus be saved. In particular, the bottom portion 62 of a bottom, not designated in any more detail, is arranged in the housing interior of a housing, not designated in any more detail, having the housing portion 41. Construction space can thus advantageously be saved.

In a further embodiment, the tubes are connected at least in portions to the bottom, not designated in any more detail, having the bottom portion 62 in a preceding manufacturing process with a form fit and/or in a materially integral manner, in particular by welding, soldering, adhesive bonding, etc. The tubes, in particular flat tubes, connected at least in portions to the bottom are introduced through an orifice, not illustrated, in the housing of the heat exchanger into the housing interior of the heat exchanger, until the first frame element 44 at least in portions touches with the first contact portion 45 the housing flange 66.

In a further manufacturing step, the first frame element 44 is connected at least in portions to the housing flange 66 with a form fit, in particular by means of connection elements 67, such as screws and nuts, rivets, etc., and/or in a materially integral manner, in particular by welding, soldering, adhesive bonding, etc.

Any appropriate demounting of the tubes and of the bottom, particularly for repair purposes, is likewise possible.

FIG. 6a shows a sectional illustration of a further version of an expansion element in the form of a ridge introduced into the bottom. Identical features are given the same reference symbols as in the preceding figures.

The housing portion 41 of a housing, not illustrated any further, has a housing wall portion 55 and a housing flange portion 56. The bottom portion 71 has a bottom end portion 72 with a bottom end portion surface 73. Furthermore, the bottom portion 71 has an expansion element 70 in the form of a ridge 74.

The bottom end portion 72 is formed essentially parallel to the housing flange portion 56.

The bottom end portion surface 73 touches the housing flange portion 56 at least in portions and is connected, in particular, in a materially integral manner, for example by welding, soldering, adhesive bonding, etc., and/or with a form fit, in particular by crimping, folding, flanging, screwing, etc.

The ridge 74 has essentially a U-shaped cross section. In the exemplary embodiment illustrated, the cross section is designed as a substantially round U.

In another exemplary embodiment illustrated, the U may be designed essentially as an angular U. In a further exemplary embodiment, the cross section of the ridge 74 may be of V-shaped design.

The ridge 74 is formed from the bottom portion 71 essentially in a direction, not designated any further, which points from the bottom portion inside 76 to the bottom portion outside 75. The bottom portion 71 of the bottom, not designated in any more detail, having the ridge 74 is produced essentially from a metal, in particular with low density, such as, for example, from aluminum or from high-grade steel. Furthermore, the bottom of the bottom portion 71 having the ridge 74 may be produced from a plastic, such as, for example, from a polymer or an elastomer or from a composite fiber material or from ceramic.

FIG. 6b shows a sectional illustration of a further version of an expansion element 77 in the form of a ridge 74 introduced into the bottom, the housing flange 78 pointing into the housing interior. Identical features are given the same reference symbols as in the preceding figures. In contrast to FIG. 6a, the housing flange 78 points in the direction of the housing interior of a housing, not designated in any more detail, having the housing portion 41.

In contrast to FIG. 6a, the housing portion 41 has a housing flange 78. The housing flange 78 is formed in the direction of the housing interior, not designated in any more detail. Construction space can thus be saved. In particular, the bottom portion 71 of a bottom, not designated in any more detail, is arranged in the housing interior of a housing, not designated in any more detail, having the housing portion 41. Construction space can thus advantageously be saved.

In a further embodiment, the tubes 79 are connected at least in portions to the bottom, not designated in any more detail, having the bottom portion 71 in a preceding manufacturing process with a form fit and/or in a materially integral manner, in particular by welding, soldering, adhesive bonding, etc.

The tubes 79, in particular flat tubes, connected at least in portions to the bottom are introduced through an orifice, not illustrated, in the housing of the heat exchanger into the housing interior of the heat exchanger, until the bottom end portion 72 at least in portions touches with the bottom end portion surface 73 the housing flange 78.

In a further manufacturing step, the bottom end portion 72 is connected at least in portions to the housing flange 78 with a form fit, in particular by means of connection elements 67, such as screws and nuts, rivets, etc., and/or in a materially integral manner, in particular by welding, soldering, adhesive bonding, etc.

Any appropriate demounting of the tubes 79 and of the bottom, particularly for repair purposes, is likewise possible.

FIG. 7 shows a sectional illustration of a housing portion in conjunction with a diffuser portion, with a first expansion element which is arranged between the housing portion and a bottom portion, and a second expansion element which is arranged between the diffuser portion and the bottom portion. Identical features are given the same reference symbols as in the preceding figures.

The diffuser portion 90 of a diffuser, not illustrated any further, may be designed as an inlet diffuser or as an outlet diffuser.

The diffuser portion 90 has a diffuser end portion 91 and a diffuser contact surface 92. The diffuser end portion 91 touches the housing flange portion 56 at least in portions. In particular, the diffuser end portion 91 is connected at least in portions to the housing flange portion 56 in a materially integral manner, in particular by welding, soldering, adhesive bonding, etc., and/or with a form fit, in particular by screwing, crimping, folding, etc. The diffuser portion 90 of the diffuser, not illustrated any further, is connected to the housing flange portion 56 by means of at least one diagrammatically illustrated fastening element 93, such as, for example, a screw.

The bottom portion 82 of the bottom, not illustrated any further, is arranged between the diffuser portion 90 of a diffuser and the housing flange portion 56 of a housing, not illustrated any further. In particular, the bottom portion 82 is arranged essentially parallel to the diffuser end portion 91 and to the housing flange portion 56. A first expansion element 80 is arranged between the bottom portion 82 and the housing flange portion 56.

The first expansion element 80 at least in portions touches with the first contact surface 86 the first bottom end portion region 84 of the bottom end portion 83. Furthermore, the first expansion element 80 touches with the second contact surface 87 the housing flange portion 56. The first expansion element 80 is produced essentially from an elastic material, such as, for example, rubber, or another plastic. Furthermore, the first expansion element 80 is designed as a sealing element.

The first expansion element 80 is designed to run peripherally essentially in the form of a ring. In another exemplary embodiment, not illustrated, the first expansion element 80 may be designed as an O-ring. In the exemplary embodiment illustrated, the first expansion element 80 has an essentially rectangular cross section.

In another exemplary embodiment, the first expansion element 80 may have a round and/or oval or square cross section. In another exemplary embodiment, the cross section may have a combination of the abovementioned forms.

A second expansion element 81 is arranged between the bottom portion 82 and the diffuser portion 90. The second expansion element 81 at least in portions touches with a first contact surface 88 the second bottom end portion contact surface 85. Essentially, the first contact surface 88 is arranged parallel to the second bottom end portion contact surface 85. Furthermore, the first expansion element 81 at least in portions touches with the second contact surface of the second expansion element the diffuser contact surface 92. Essentially, the diffuser contact surface 92 is formed parallel to the second contact surface 89 of the second expansion element.

The first expansion element 81 is produced at least in portions from an elastic material, such as, for example, plastic or rubber, or from another elastomer. In the exemplary embodiment illustrated, the second expansion element 81 has essentially a rectangular cross section.

In another exemplary embodiment, the second expansion element 81 may have an oval cross section and/or a round cross section and/or a square cross section.

In another embodiment, the second expansion element 81 has a cross section which is designed as a combination of the abovementioned forms. The second expansion element 81 may, for example, be an O-ring. The second expansion element 81 is designed to run peripherally essentially in the form of a ring.

FIG. 8 shows an exploded illustration of a heat exchanger 100.

The heat exchanger 100 has a housing 101. The housing 101 is essentially designed as a hollow body. The housing 101 has essentially a rectangular, in particular square cross section.

In another exemplary embodiment, not illustrated, the housing 101 has a round or oval cross section. In the exemplary embodiment illustrated, the housing 101 is produced from a cast metal material. In particular, the housing 101 is produced from gray cast iron or from cast steel or from aluminum.

In another exemplary embodiment, not illustrated, the housing 101 is produced from plastic or from ceramic or from a composite fiber material.

Fastening bodies 102 serve for fastening the housing 101, for example, to a drive unit, such as an internal combustion engine. The fastening body 102 has an essentially rectangular material clearance 103 and an essentially round fastening orifice 104. Fastening elements, not illustrated any further, can be inserted through the orifice 104. In the exemplary embodiment illustrated, the fastening body 102 is produced essentially in one piece with the housing 101.

In another exemplary embodiment, the fastening bodies 102 may be connected to the housing 101, for example, in a materially integral manner by welding, soldering, adhesive bonding, etc.

The housing 101 has first reinforcing ribs 105. Adjacent first reinforcing ribs are arranged essentially parallel to one another. The first reinforcing ribs 105 run essentially from a first housing flange 109 to a second housing flange 110, or vice versa.

Furthermore, the housing 101 has second reinforcing ribs 106. Adjacent second reinforcing ribs 106 are arranged essentially parallel to one another. The second reinforcing ribs 106 are arranged so as to run essentially peripherally around the housing 101. The second reinforcing ribs 106 are arranged essentially perpendicularly to the first reinforcing ribs 105.

In another exemplary embodiment, not illustrated, the first reinforcing ribs 105 may have an angle of between 0° and 90°, in particular of between 20° and 70°, with the second reinforcing ribs 106.

Furthermore, the housing 101 has a first connection piece 107 and a second connection piece 108. The first connection piece 107 and/or the second connection piece 108 are/is designed essentially cylindrically. In particular, coolant flows through the connection pieces 107 and 108 into the heat exchanger 100 and/or out of this.

The coolant is, in particular, an aqueous cooling liquid or a gas, such as, for example, air.

The housing 101 has a first housing flange 109 and a second housing flange 110 at the ends, not designated in any more detail. In particular, the first housing flange 109 is arranged at one end and the second housing flange 110 is arranged at the other end, not designated in any more detail. The first housing flange 109 and/or the second housing flange 110 are/is designed essentially as a rectangular frame with rounded corners.

In another exemplary embodiment, the first housing flange 109 and/or the second housing flange 110 may be of oval design.

The first housing flange 109 has at least one orifice 111 which is of essentially round design. In the exemplary embodiment illustrated, the first housing flange 109 has eight orifices 111. In another exemplary embodiment, the first housing flange 109 and/or the second housing flange 110 may have one to eight or more than eight orifices 111.

In particular, the orifices 111 have a thread, not designated in any more detail, into which fastening elements 119, such as, for example, screws, can be screwed.

The heat exchanger 100 has a first diffuser 112 and a second diffuser 113. The first diffuser 112 is designed essentially identically to the second diffuser 113. In another exemplary embodiment, the first diffuser 112 may be designed differently from the second diffuser 113.

In the exemplary embodiment illustrated, the first diffuser 112 has a first flange 114 and a second flange 115. The first diffuser 112 is designed essentially pyramidally as a four-sided pyramid. The first flange 114 is essentially formed as a frame element from the bottom of the four-sided pyramid. The second flange 115 is essentially formed from the vertex of the four-sided pyramid. The first flange 114 is of essentially frame-shaped design.

Fastening cylinders 116 are formed from the first flange 114. The fastening cylinders 116 have orifices 118, in particular round orifices. In the exemplary embodiment illustrated, fastening elements 119, in particular screws, are inserted through the orifices 118. In the exemplary embodiment illustrated, the first flange 114 has eight fastening cylinders 116, each with an orifice 118.

In another exemplary embodiment, the first flange 114 has one to eight or more than eight fastening cylinders 116, each with an orifice 118.

Second fastening cylinders 117 are formed from the second housing flange. In the exemplary embodiment illustrated, the fastening cylinders 117 are identical to the fastening cylinders 116.

In another exemplary embodiment illustrated, the fastening cylinders 117 are designed differently from the fastening cylinders 116.

The second flange 115 formed from the vertex of the four-sided pyramid is designed essentially as a triangular body. The corners, not designated in any more detail, of the second flange are essentially rounded. In each case an orifice 120 is introduced into the second flange 115 adjacently to the corners, not designated in any more detail. In the exemplary embodiment illustrated, the flange 115 has, overall, three orifices 120. In another exemplary embodiment, the flange 115 may have one to three or more than three orifices 120.

An orifice 125 is arranged at the center of the flange 115. Essentially the medium to be cooled, such as, for example, exhaust gas, flows through the orifice 125 into the heat exchanger 101 and out of the latter.

A bottom 121 and also a first frame element 122 and a second frame element 123 are arranged, essentially parallel to one another and parallel to the first housing flange 109 and/or parallel to the first flange of the diffuser 114, between the flange 115 and the first housing flange 109.

The bottom 121 is arranged essentially between the first frame element 122 and the second frame element 123. The bottom 121 is arranged essentially concentrically to the first frame element 122 and to the second frame element 123. In the exemplary embodiment illustrated, the bottom 121 corresponds to the bottom 1 from FIG. 1 or to the bottom 20 from FIG. 2. In another exemplary embodiment, the bottom 121 may be designed differently from the bottom 1 of FIG. 1 or from the bottom 20 of FIG. 2.

The first frame element 122 and/or the second frame element 123 have/has orifices 124. In particular, the orifices 124 are designed as holes, not designated in any more detail. The first housing flange 109, the first flange of the diffuser 114, the bottom 121, the first frame element 122 and the second frame element 123 have essentially the same hole pattern.

The first frame element 122 and the second frame element 123 are designed essentially as bottom frames 2 of FIG. 1 and FIG. 2. The frame element 122 and the frame element 123 may be produced from metal, such as, for example, from aluminum or high-grade steel, or from plastic, such as, for example, from an elastomer.

Furthermore, the first frame element 122 and the second frame element 123 may be designed as a sealing element consisting of rubber.

The first diffuser 112, the first frame element 122, the second frame element 123 and the bottom 121 are connected to the first housing flange 109 of the housing 101 by means of the fastening elements 119, in particular by means of the screws. In the exemplary embodiment illustrated, the second diffuser 113 is connected to the second housing flange 110 of the housing 101 in the same way.

In another exemplary embodiment, the first diffuser 112 and/or the second diffuser 113 are connected to the housing 101 with a form fit, for example by crimping, folding or flanging, and/or in a materially integral manner by welding, soldering, or adhesive bonding.

FIG. 9 shows a sectional illustration of a flat tube bundle with turbulence-generating elements.

The flat tube bundle 200 has a number of flat tubes 201 which are arranged essentially parallel to one another. The flat tube bundle 200 is introduced, in particular, into a housing 101 of the heat exchanger 100 of FIG. 8.

The flat tubes 201 have a flat tube wall 202. Furthermore, the flat tubes 201 have in each case at least one flat tube orifice 203, in particular in each case two flat tube orifices 203 for each flat tube 201. Bosses 205 are produced from the flat tubes 201 out of the flat tube wall 202 outward, in particular by means of a forming manufacturing method, such as, for example, embossing, stamping, pressing, etc. Adjacent flat tubes 201 are supported with respect to one another by means of the bosses 205. At least one boss 205 of a flat tube 201 touches at least in portions the flat tube wall 202 of an adjacently arranged flat tube 201. Furthermore, turbulence-generating elements 204, likewise in the form of bosses or winglets, may be formed out of the flat tube wall 202 in the direction of the tube interior, not designated in any more detail, of a flat tube 201. In particular, the turbulence-generating elements 204 are introduced by means of a forming manufacturing method, such as stamping, embossing, pressing, etc.

Furthermore, the turbulence-generating elements 204 may be designed as turbulence inserts. These push-in turbulence inserts are, in particular, embossed or stamped into a sheet metal element by means of a forming manufacturing method. The push-in turbulence inserts 204 can be introduced into at least one flat tube 201 via the flat tube orifice 203. Via the bosses 205 of the flat tubes 201, which are arranged adjacently to a housing wall, not illustrated, of a housing of a heat exchanger, the flat tube bundle 200 is supported against the housing wall, not illustrated, of the housing of the heat exchanger.

FIG. 10 shows a flat tube bundle 300 as a disk stack 302.

The flat tube bundle 300 has a number of flat tubes 301.

A flat tube 301 has, in particular, an upper disk 303 and a lower disk 304. The upper disk 303 and the lower disk 304 are connected to one another at least in portions in a materially integral manner, in particular by welding, soldering, adhesive bonding, etc., and/or with a form fit, in particular by folding, crimping, flanging, etc.

The upper disks 303 and/or 304 have in each case one, in particular two, disk orifices 305.

The disk orifices 305 are introduced into disk ring portions 306 which are formed out of the upper disk 303 and/or out of the lower disk 304, in particular by means of a forming manufacturing method, such as, for example, embossing, stamping, etc.

The disk ring portions 306 or the disk orifices 305 of adjacent flat tubes 301 touch one another at least in portions and, in particular, are connected to one another at least in portions in a materially integral manner, in particular by welding, soldering, adhesive bonding, etc.

The flat tubes 301 have turbulence-generating elements. These turbulence-generating elements, not designated in any more detail, are introduced into the flat tubes 301, for example, as a turbulence insert. The turbulence insert is, in particular, a metal sheet with embossings which are introduced, in particular, into the metal sheet by means of a forming manufacturing method, such as, for example, stamping or embossing. The at least one turbulence insert is arranged, in particular, between an upper disk 303 and a lower disk 304. In another exemplary embodiment, a turbulence-generating element is introduced into the upper disk 303 and/or the lower disk 304 of the flat tube 301 by means of a forming manufacturing method, such as, for example, embossing, stamping, etc. A cavity 308 is formed between adjacent flat tubes at least in portions between the two disk ring portions 306 of a flat tube 301. Turbulence-generating elements 307 in the form of turbulence inserts can be introduced at least in portions into the cavity 308. The turbulence inserts are connected at least in portions to at least one flat tube 301, in particular by welding, soldering, adhesive bonding, etc.

FIG. 11 shows a further version of a flat tube bundle 400 in the form of a disk stack 401.

The flat tube bundle 400 has a number of flat tubes 402. A flat tube 402 has in each case an upper disk 403 and a lower disk 404. The upper disk 403 and the lower disk 404 are at least in portions connected to one another in a materially integral manner, in particular by welding, soldering, adhesive bonding, etc., and/or with a form fit, in particular by crimping, folding, flanging, etc.

Two conical elements are formed out of the upper disk 403. The conical elements 406 in each case have an orifice 407.

The lower disk 404 has at least one orifice 405.

Adjacent flat tubes 402 are connected to one another at least in portions in a materially integral manner, in particular by welding, soldering, adhesive bonding, etc., and/or with a form fit, in particular by crimping, folding, flanging, etc. Turbulence-generating elements in the form of turbulence inserts 408 are introduced between adjacent flat tubes 402. A turbulence insert is, in particular, a metal sheet, into which embossings, which lead to the swirling of a flow medium, are introduced by means of a forming manufacturing method.

Turbulence-generating elements in the form of turbulence inserts 408 are likewise introduced between the upper disk 403 and the lower disk 404. In another version, not illustrated, turbulence-generating elements are introduced into the upper disk 403 and/or the lower disk 404 by means of a forming manufacturing method, such as, for example, embossing, stamping, etc.

FIG. 12 shows a further exemplary embodiment or a development of a bottom 500 with an expansion element 501. Identical features are given the same reference symbols in FIG. 12 as in the preceding figures. For the description of these features, reference is made to the corresponding figures. An enlarged illustration of a detail is illustrated in section.

The bottom 500 has a first plate 506 which has an orifice, not designated in any more detail, in the center of the plate 506. The plate 506 is designed in such a way that it surrounds the orifice, not illustrated, in a frame-like manner. The plate 506 is produced from steel, such as, for example, high-grade steel or another steel. However, it may also be produced from aluminum or another metal. In another embodiment, not illustrated, the plate is produced from plastic or from a composite fiber material or from a ceramic material. The plate 506 has a thickness of 0.3 mm to 2 mm, in particular of between 0.5 mm and 1 mm, in particular of between 0.6 mm and 0.9 mm, in particular 0.8 mm.

The plate 506 has an expansion element 501. The expansion element 501 has a first bead-shaped embossing 502 and a second bead-shaped embossing 505. The first embossing 502 and/or the second bead-shaped embossing 505 are arranged essentially concentrically to the orifice, not illustrated, in the plate 506 and/or essentially concentrically to one another. The first embossing 502 is embossed out of the plate essentially in the direction of an axis A1. The second embossing 505 is embossed out of the plate essentially in the direction of an axis A2. The axes A1 and A2 may be arranged parallel to one another. In another embodiment of the invention, the axes A1 and A2 are arranged at an angle of between 0° and 90°, in particular of between 5° and 70°, in particular of between 8° and 45°, in particular of between 9° and 30°, in particular of between 10° and 15°, to one another. The axis A1 and/or the axis A2 are/is essentially parallel to a normal vector of the plate 506, but, in another embodiment, may also be arranged at an angle of between 0° and 90°, in particular of between 5° and 70°, in particular of between 8° and 45°, in particular of between 9° and 30°, in particular of between 10° and 15°, to a normal vector of the plate 506. In the exemplary embodiment illustrated, the first embossing 502 and the second embossing 505 are formed out of the plate in such a way that the second embossing 505 forms a valley with respect to the plate 506 and the first embossing 502 forms a kind of rampart with respect to the plate 506. In another exemplary embodiment, the first and the second embossing both form a valley or both form a rampart. The first embossing 502 and the second embossing 505 adjoin one another essentially directly.

The plate 506 has an angularly designed region 503 which adjoins the first embossing 502 essentially directly.

A second plate 507 is designed essentially in the same way as the bottom surface orifice lattice 9 and has the features of the bottom orifice lattice 9 described in the preceding figures. The second plate 507 is produced from a material, such as high-grade steel, or from another steel. In another exemplary embodiment, the second plate 507 is produced from aluminum or from another metal. In a further exemplary embodiment, not illustrated, the second plate is produced from a material, such as a composite fiber material, from a plastic or from a ceramic-containing material. The second plate 507 has a thickness of 0.5 mm to 5 mm, in particular a thickness of between 1 mm and 4 mm, in particular a thickness of between 1.5 mm and 3 mm, in particular a thickness of 2 mm.

The first plate 506 and the second plate 507 are connected to one another in a materially integral manner via the angular region 503 of the first plate 506 by means of a margin 508 of the second plate 507, such as, for example, by means of at least one weld seam 504 by means of welding, in particular laser welding, or by soldering by means of a soldering seam or by adhesive bonding by means of an adhesive seam, etc. The first plate 506 and the second plate 507 may also be connected to one another with a form fit by folding, flanging, crimping, etc. solely or in addition to the materially integral connection.

In a further embodiment of the invention, before the final materially integral and/or form-fit connection, as described in the previous section, the first plate 506 and the second plate 507 are connected or pre-assembled nonpositively, so that the first plate 506 is braced with the second plate 507 via the angularly designed region 503.

Thus, in a further processing step, the tubes 79, 201, in particular the flat tubes, are then connected to the second plate 507 of the bottom 500 in a materially integral manner, for example by welding, such as laser welding, and the second plate 507 is subsequently or previously or simultaneously connected to the first plate 506. Thus, work time, such as rechucking time, can be saved, and the production costs can be lowered particularly advantageously.

In another exemplary embodiment, not illustrated, the first plate 506 and the second plate 507 are produced in one piece.

The first plate 506 is stamped out or sawn out or pressed out or is produced by means of a severing manufacturing method, such as sawing, cutting, such as, for example, laser beam cutting or water jet cutting. The contour of the first plate may also be produced in the same way. In a further manufacturing step, the first embossing 502 and/or the at least second embossing 505 and/or the angularly designed region are produced by means of a forming manufacturing method, such as pressing, stamping, etc.

The following sections may relate to one of the FIGS. 1 to 12 described above:

In another exemplary embodiment, not illustrated, one to three frame elements 2, 44, 47, 50, 122, 123 or more than three frame elements 2, 44, 47, 50, 122, 123 are used.

In another exemplary embodiment, not illustrated, the housing flange portion 36, 56, 66, 78, 114, 115 has at least one groove, into which the expansion element is formed as a sealing element, such as, for example, as an O-ring, etc. and can be introduced or is introduced into the groove.

In another exemplary embodiment, not illustrated, the expansion element 24, 30, 40, 43, 60, 65, 70, 74, 77, 80, 81 is produced from plastic, such as, for example, from an elastomer or from rubber, or from metal, such as, for example, from high-grade steel or aluminum, or from a composite fiber material which, for example, has metal and plastic.

In an exemplary embodiment, the bottom of the heat exchanger has the same bottom thickness d everywhere. This assumes essentially values of $0.5$ mm$<d<7.0$ mm, in particular values of between $0.5$ mm$<d<4$ mm, in particular values of between $0.5$ mm and $3.0$ mm, in particular values of between $0.5$ mm$<d<2.5$ mm, in particular values of between $1$ mm$<d<2.5$ mm, in particular values of between $1.5$ mm$<d<2.0$ mm, in particular values of between $1.6$ mm$<d<1.9$ mm, in particular values of between $1.65$ mm$<d<1.85$ mm.

In another exemplary embodiment, the bottom of the heat exchanger has a different bottom thickness d in the different regions.

In particular, the bottom thickness d is designed to be thinner in the marginal regions, in particular in the frame portions or the outer frame portions than in the inner portion of the bottom, in particular in the center portion of the bottom in which the tubes are received.

The bottom thickness d assumes essentially values of $0.5$ mm$<d<7.0$ mm, in particular values of between $0.5$ mm$<d<4$ mm, in particular values of between $0.5$ mm and $3.0$ mm, in particular values of between $0.5$ mm$<d<2.5$ mm, in particular values of between $1$ mm$<d<2.5$ mm, in particular values of between $1.5$ mm$<d<2.0$ mm, in particular values of between $1.6$ mm$<d<1.9$ mm, in particular values of between $1.65$ mm$<d<1.85$ mm.

The features of the various exemplary embodiments can be combined with one another as desired. The invention can also be used for fields other than those shown.

The invention claimed is:

1. A heat exchanger for exhaust gas cooling, the heat exchanger comprising:
   a housing;
   at least one first flow duct for a first medium;
   at least one second flow duct for a second medium; and
   at least one bottom which is connected to the housing,
   wherein the bottom comprises:
      a first plate comprising an outer peripheral end surface, an inner peripheral end surface, and a curved surface extending between the outer peripheral end surface and the inner peripheral end surface, the curved surface including an expansion element configured to compensate for a longitudinal expansion of the at least one first flow duct and an angular, region extending from the expansion element to the inner peripheral end surface, and
      a second plate comprising a bottom surface orifice lattice, a first surface extending in a plane perpendicular to an axial direction of the first flow duct, a second surface opposing the first surface and extending in a plane parallel to the first surface, and a peripheral end surface extending between the first surface and the second surface,
   wherein the first plate extends peripherally around the second plate,
   wherein the expansion element comprises a first embossing and a second embossing, the first embossing extending peripherally around the bottom surface orifice lattice, and the second embossing extending peripherally around the first embossing, and
   wherein the curved surface of the first plate includes a portion that (i) is located in the angular region, (ii) extends in a direction substantially perpendicular to the planes of the first and second surfaces of the second plate, and (iii) is attached to the peripheral end surface of the second plate.

2. A heat exchanger according to claim 1, wherein the expansion element is expandable axially in a heat exchanger longitudinal direction.

3. A heat exchanger according to claim 1, wherein the expansion element is expandable radially to a heat exchanger longitudinal direction.

4. A heat exchanger according to claim 1, wherein the expansion element comprises at least one ridge.

5. A heat exchanger according to claim 1, wherein the housing is a cast housing.

6. A heat exchanger according to claim 1, wherein at least one connection piece, at least one fastening body, or a combination thereof is produced in one piece with the housing.

7. A heat exchanger according to claim 1, wherein the bottom is connected to the housing in a materially integral manner or via a screw, a flange, a fold, or a crimp.

8. A heat exchanger according to claim 1, wherein the heat exchanger is configured to allow an I-flow of the first medium.

9. A heat exchanger according to claim 1, wherein the heat exchanger is configured to allow a U-flow of the first medium.

10. A heat exchanger according to claim 1, wherein the heat exchanger is configured to allow a single-flood or multi-flood flow.

11. A heat exchanger according to claim 1, wherein the first medium is exhaust gas and the second medium is a cooling medium.

12. A heat exchanger according to claim 1, wherein the at least one first flow duct comprises at least one flat tube.

13. A heat exchanger according to claim 12, wherein the at least one flat tube comprises at least one turbulence-generating element.

14. A heat exchanger according to claim 13, wherein the at least one turbulence-generating element comprises at least one embossing.

15. A heat exchanger according to claim 12, wherein the at least one flat tube touches the housing.

16. A heat exchanger according to claim 14, wherein the at least one embossing of the at least one turbulence-generating element touches the housing.

17. A heat exchanger according to claim 12, wherein the at least one flat tube comprises a first flat tube and a second flat tube, and an embossing of the first flat tube touches the second flat tube.

18. A heat exchanger according to claim 1, further comprising at least one first disk, wherein the at least one first disk has a first disk topside and a first disk underside.

19. A heat exchanger according to claim 18, further comprising at least one second disk, wherein the at least one second disk has a second disk topside and a second disk underside.

20. A heat exchanger according to claim 19, wherein the at least one first disk and the at least one second disk form a disk stack.

21. A heat exchanger according to claim 19, wherein the first flow duct is formed between the at least one first disk topside and the at least one second disk underside and the second flow duct is formed between the at least one first disk underside and another at least one second disk topside.

22. A heat exchanger according to claim 19, wherein the second flow duct is formed between the at least one first disk topside and the at least one second disk underside and the first flow duct is formed between the at least one first disk underside and another at least one second disk topside.

23. A heat exchanger according to claim 18, wherein the first flow duct is formed between the at least one first disk and the housing.

24. A heat exchanger according to claim 18, wherein the second flow duct is formed between the at least one first disk and the housing.

25. A heat exchanger according to claim 1, wherein the expansion element has a form of an S-shaped double bead.

26. A heat exchanger according to claim 1, wherein the angular region of the first plate is angled so as to extend in a direction substantially parallel to an axial direction of the at least one first flow duct.

* * * * *